Fig. 2 H₂S SORPTION APPARATUS

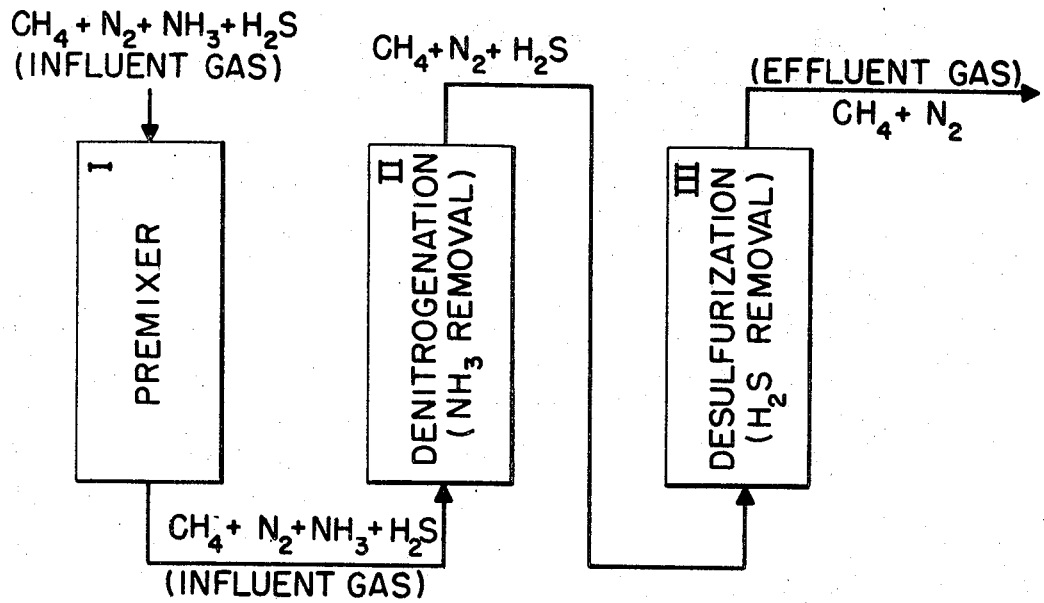
Fig. 1 REMOVAL AND SEPARATION OF $H_2S$ AND $NH_3$ FROM MIXTURE OF BOTH GASES
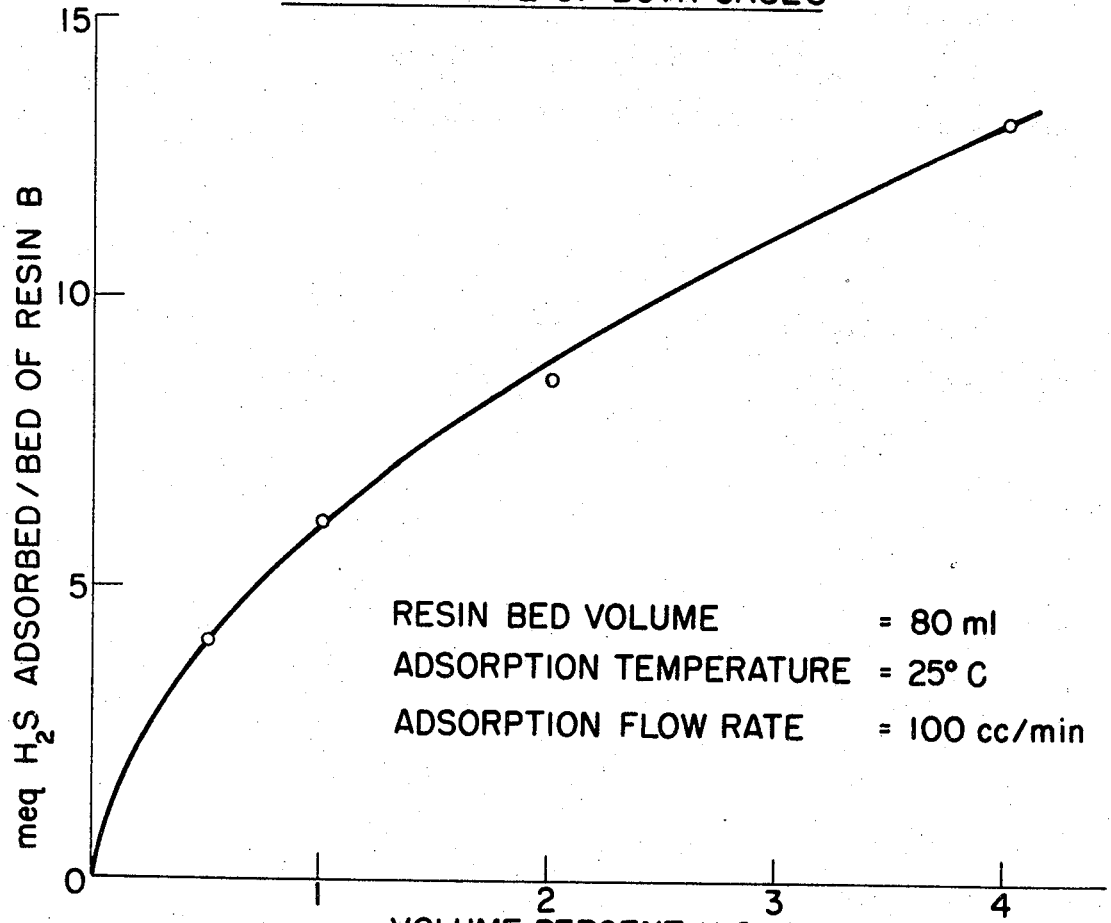
RESIN BED VOLUME = 80 ml
ADSORPTION TEMPERATURE = 25° C
ADSORPTION FLOW RATE = 100 cc/min
Fig. 3 ISOTHERM (DYNAMIC)—HYDROGEN SULFIDE ADSORPTION

H₂S ADSORPTION SYSTEM

H₂S DESORPTION SYSTEM

Fig. 4  COLUMN PERFORMANCE OF RESIN B TOWARD HYDROGEN SULFIDE (2° H₂S IN NITROGEN)
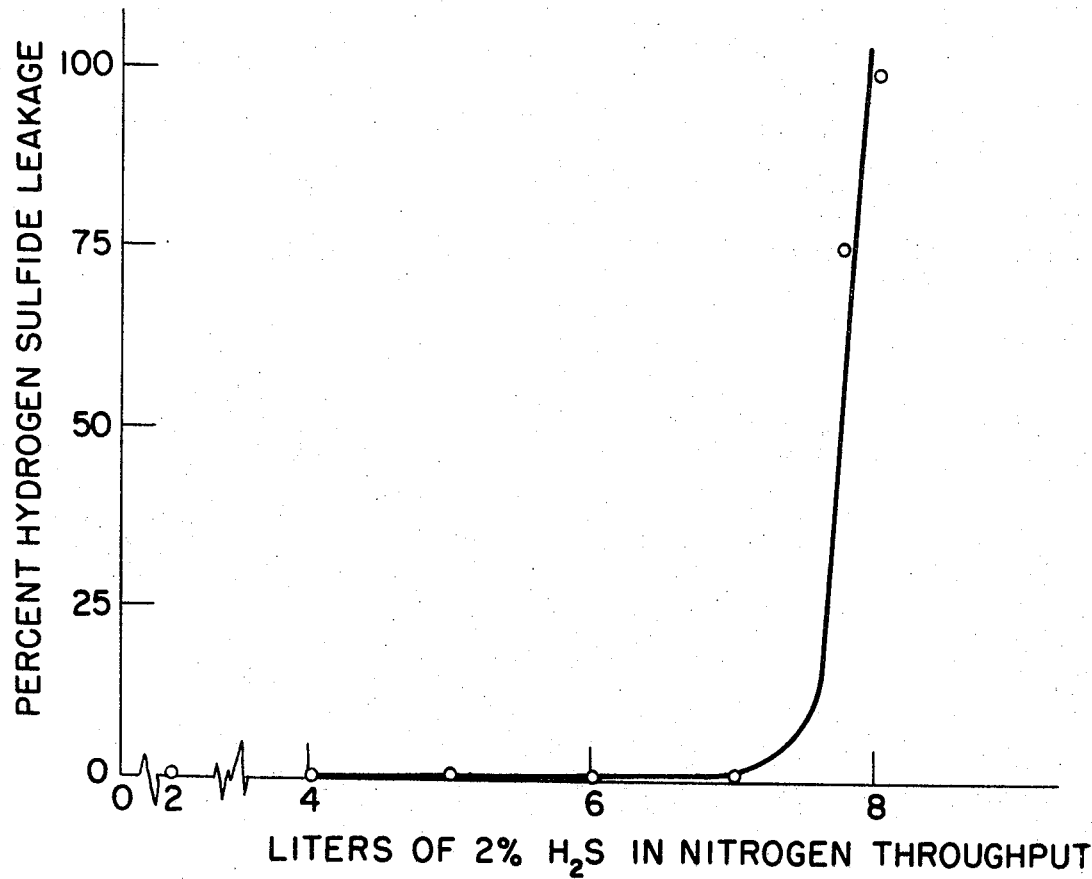
Fig. 6  EFFECT OF TEMPERATURE ON H₂S DESORPTION
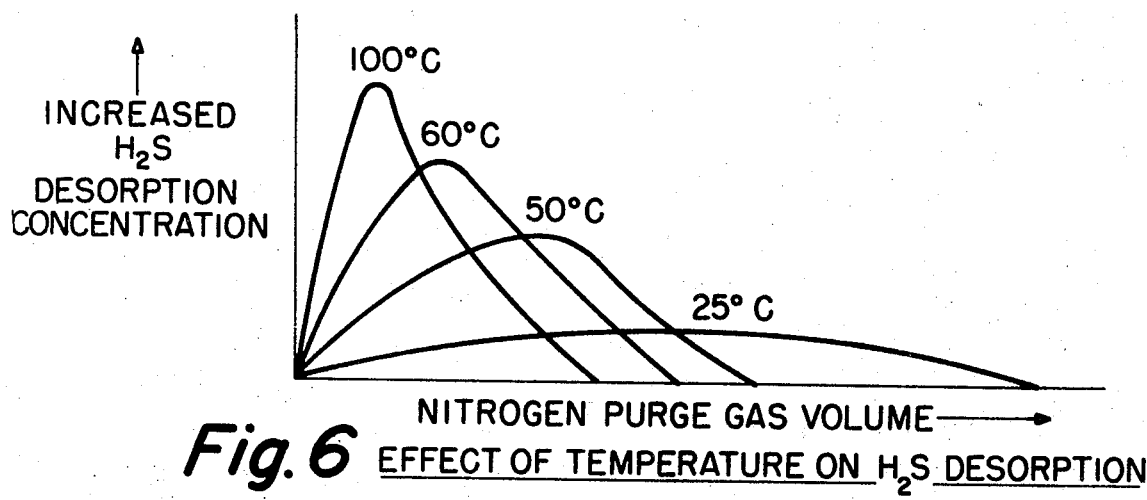

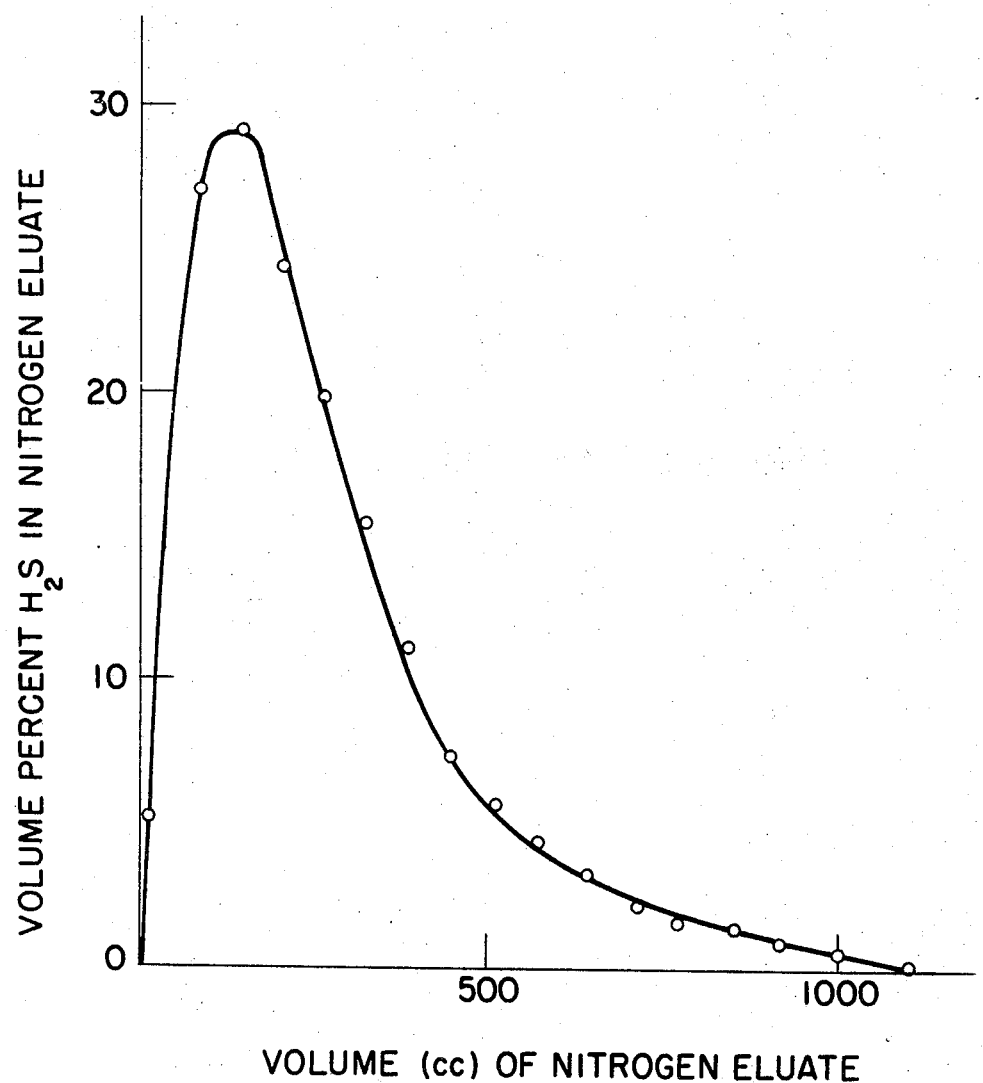

United States Patent Office 3,556,716
Patented Jan. 19, 1971

3,556,716
REMOVAL OF H₂S AND NH₃ FROM GAS STREAMS
Frank X. Pollio, Philadelphia, Pa., Kenneth A. Kun, Tokyo, Japan, and Robert Kunin, Yardley, Pa., assignors to Rohm and Haas Company, Philadelphia, Pa., a corporation of Delaware
Filed Apr. 5, 1967, Ser. No. 628,579
Int. Cl. G01d 53/00, 53/14; C01c 1/12
U.S. Cl. 23—2
20 Claims

ABSTRACT OF THE DISCLOSURE

Natural gases, particularly those resulting from petroleum refining operations, frequently contain undesirably excessive quantities of $H_2S$ and $NH_3$. The $H_2S$ gas is removed by treatment with substantially anhydrous macroreticular or macroporous ion exchange resins having a prescribed minimum surface area and ion exchange functionality. The $NH_3$ is removed by treatment with carboxylic type cation exchange resins.

---

This invention concerns a process for removing hydrogen sulfide and/or ammonia from gaseous streams.

More particularly, the invention relates to the removal of $H_2S$ from natural gas and from the gas refining streams of petroleum processing operations, optionally followed or preceded by the removal of $NH_3$, if desired, by bringing the gases into contact with separate beds of certain ion exchange materials. Even more particularly, the invention involves a cyclic process in which a two bed ion exchange column system is employed for desulfurizing (removing $H_2S$) and optionally denitrogenating (removing $NH_3$) the gas mixture being treated.

Other objects of the invention concern the removal of $H_2S$ from gaseous streams which contain $CH_4$ and/or $CO_2$.

The critical need of such a system may be appreciated from the following description of a condition which has long existed in industry. Hydrogen sulfide is a common waste product of many industrial processes, and is a major contributor to objectionable atmospheric pollution. Although the reduction of hydrogen sulfide contamination is desirable for that reason alone, an additional objective is to utilize the $H_2S$ present in various gaseous streams as a valuable source of sulfur.

Probably the greatest need for processing source materials containing $H_2S$ arises in the natural gas and petroleum industries. Due to the fact that $H_2S$ is toxic and corrosive, even the presence of minute quantities of it in a process gas is objectionable. It is common in hydrogenation processes employed for the desulfurization and denitrogenation of lower grades of petroleum fractions to convert to hydrocarbons the obnoxious and undesirable sulfur and nitrogen compounds present. This causes the release of $H_2S$ and $NH_3$ gases into the hydrogen stream. The removal of such gases becomes a necessity since the sulfur compounds react with metal and metal oxide catalysts, often causing "poisoning" of the catalysts by converting them to sulfides, and the nitrogen compounds severely poison platinum-containing catalysts at all concentrations of nitrogen compounds, where the compounds are basic or non-basic in nature.

Several processes have been used in industry for hydrogen sulfide removal, but all have been limited in either application or efficiency for one reason or another. In no case has there been a successful $H_2S$ removal technique based on the utilization of ion exchange resins. In fact, very little has been disclosed in the prior art concerning the use of ion exchange resins for gas phase application. The principal references in this field have been G. F. Mills (Report PB 15608, Office of Technical Services, United States Department of Commerce). D. A. Robinson and G. F. Mills (Ind. Eng. Chem. 41, 2221–1949), and R. Cole and H. L. Shulman (Ind. Eng. Chem. 52, 859–1960). Mills and Robinson disclose the use of a polyamine ion exchanger for removing acidic or amine reactive substances from a gas phase.

Cole and Shulman describe the use of dry anion exchange resins for the sorption of sulfur dioxide. They observed that a gel type anion exchange resin (hereinafter referred to as Resin A) such as that described in U.S. Patent 2,591,573, operated dry and in the chloride form, satisfactorily adsorbed $SO_2$ and reported that desorption of the gas from the resin could be accomplished by using dry air at 100° C. However, we have tried that method and have found that $SO_2$ is not completely and efficiently desorbed thereby. For example, in a seven cycle adsorption-desorption study using an anion exchange resin of the macroporous structural type disclosed in Canadian Patent 708,227 we found that there was a 78% overall reduction in $SO_2$ adsorption capacity relative to the $SO_2$ loading observed during the initial cycle, and a 55% drop in the amount of $SO_2$ that could be desorbed at that point.

Although the method of Cole and Shulman removes sulfur dioxide to the extent indicated, its usefulness has been limited because the gas that is adsorbed is held by the resin so tenaciously that upon attempting to desorb the gas extremely high temperatures must be employed. This causes degradation of the resin, and the consequent inability of the resin to absorb any more sulfur dioxide.

In view of the fact that the gel resin is unstable when exposed to the high temperatures necessary to bring about the desorption of $SO_2$, it has been concluded that a chemical bonding of the resin to the gas must take place during the adsorption stage, instead of a normal, reversible, physical sorption. This naturally led to the theory that if a resin with much greater stability towards heat were employed, that problem would be solved. Accordingly, it seemed logical that if the newer, much more durable macroreticular or macroporous ion exchange resins (described in U.S. Pat. 3,247,242, Canadian Pat. 708,227 and Dutch Patent 6,607,565) were employed, this problem of chemical breakdown of the resin would be eliminated. However, upon using such macroreticular strong base resins in the chloride form to pick up $SO_2$ it was discovered that the same problem of rapid degradation resulted.

This discovery led to the logical conclusion that it is futile to use anion exchange resins, whether of a gel or macroreticular nature, to pick up gases. Thus, when the problem arose concerning the need to remove either $H_2S$ or $NH_3$ alone, or the combination of $H_2S$ and $NH_3$, the first impulse of experimenters in this field was to reject the use of ion exchange as a possible solution, especially when economic factors dictated that the ion exchange resins would have to be regeneratable. The fact that experience with the removal of $SO_2$ by ion exchange had been unsatisfactory led persons skilled in this art to expect even worse results when $H_2S$ was the gas to be removed by ion exchange techniques. This is because $SO_2$ is a much more reactive and acidic material than $H_2S$. It was, therefore, quite unexpected to find that the opposite result took place, namely there was an excellent sorption of $H_2S$ and of $NH_3$ when certain ion exchange resins were employed. Moreover, contrary to the experience with $SO_2$ removal, it was found that the desorption of $H_2S$ and of $NH_3$ could be accomplished at temperatures which were not high enough to be deleterious to the resins. This fact was of particular importance since it meant that the resins could be used in a cyclic process, thereby contributing to improved economics of the method as the resins could be used over and over.

In the situation where both $H_2S$ and $NH_3$ are mixed together in gaseous streams another problem has existed in the separation of the two and recovery of each one. In view of the fact that $NH_3$ is a basic gas, and thereby would have some affinity for $H_2S$, the logical assumption would have been that the adsorption of $H_2S$ from such a mixture would have been far less effective than when $H_2S$ is the sole gas present that has to be removed. However, quite surprisingly, it was discovered that the removal of $H_2S$ in the presence of $NH_3$ worked just as well as when $H_2S$ was present alone. Moreover, the method employed has considerable flexibility for it is possible to remove first the $NH_3$ and then the $H_2S$, or alternatively to first remove the $H_2S$ and then remove the $NH_3$.

A resin of the type which works effectively in the present invention to remove $H_2S$, hereinafter identified as Resin B, is the chloride form of a cross-linked quaternary ammonium synthetic polymer, preferably of styrene and divinylbenzene, which is prepared in the presence of a diluent that is substantially removed from the polymer thus formed. The resin may be made of other polymers and has a macroreticular structure. A description of such polymers and structure, along with detailed explanations for making same, will be found in U.S. Pat. 3,247,242 (particularly in columns 2 and 3), Canadian Pat. 708,227 and Dutch Pat. 6,607,566, all of which are incorporated herein by reference. A critical requirement for the resin to be useful in the present invention is that it must have a minimum surface area of approximately 5 sq. m./gm., and it is also essential that it be employed in an anhydrous system. A further critical requirement is that it have a minimum of 1.0 meq./g. anion exchange capacity. Resins failing to meet either of these minima are incapable of performing satisfactorily in the present invention.

The present invention is illustrated in the accompanying drawings wherein:

FIG. 1 is a schematic flow chart showing the invention as practiced in a cyclical process;

FIG. 2 schematically illustrates a laboratory type $H_2S$ sorption apparatus (2A showing adsorption and 2B showing desorption);

FIG. 3 is a graph showing an isotherm of a $H_2S$ adsorption by the present invention;

FIG. 4 is a graph showing the typical performance of the present invention in the removal of $H_2S$;

FIG. 5 is a graph showing the relative ease with which $H_2S$ is desorbed from the resins employed in the present invention; and FIG. 6 is a graph showing the effect of temperature on $H_2S$ desorption.

Figure 2A:
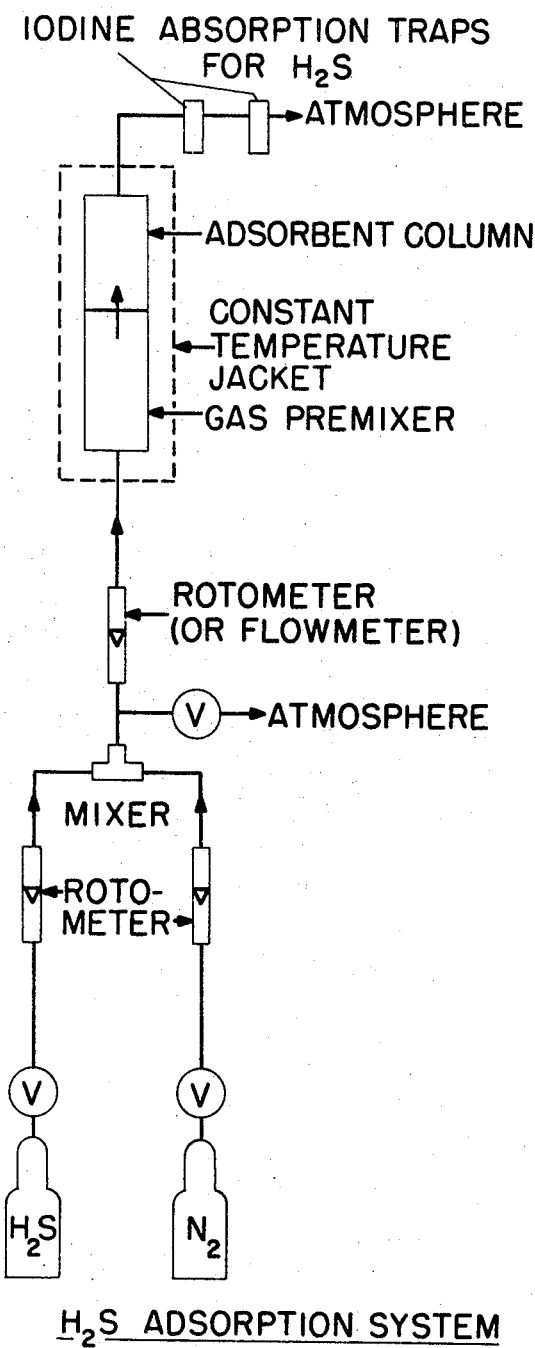

Referring to the drawings, the cyclic process for removing both $H_2S$ and $NH_3$ from a mixture containing low concentrations of both of these gases will be described first. In a typical mixture which was treated in this manner the composition of the gases was as follows (in volume percent): 55.50 $CH_4$; 42.80 $N_2$; 0.85 $H_2S$; and 0.85 $NH_3$. Column I was a pre-mixer containing no resin, and serving merely to mix the gases thoroughly before proceeding to the next column. In the illustrated cyclic process Column II contained Resin J, a carboxylic macroreticular structured cation exchange resin in the hydrogen form such as is described in U.S. Pat. 2,340,010; 2,340,111; 2,597,437 and 3,269,911. A particularly preferred carboxylic cation exchanger is one prepared by suspension copolymerizing a mixture of methocrylic acid and about 3 to 10% divinylbenzene. Column II optionally can precede or follow Column III. A further option is to eliminate Column II altogether, in the event that it is not desired or required to remove $NH_3$, and only $H_2S$ is to be removed.

The next column through which the gases are passed is Column III, containing Resin B, which has been described above. FIG. 1 adequately describes the components of the influent gas, as well as the nature of the effluent gas from Column II and from Column III. After the mixture of gases had been processed to a point where some $H_2S$ leakage from Column III was detected, the system was shut down and Resin B in Column III was thermally regenerated with nitrogen at 100° C. until substantially all the $H_2S$ which had been picked up on that resin was removed, as established by a standard moist lead acetate paper test which can detect as little as a few p.p.m. $H_2S$. The cyclic process was continued until Resin J in Column II became exhausted, a point which arbitrarily was determined to be that at which there was a 10% breakthrough or leakage of the $NH_3$ in the effluent from Column II. This was found to occur after 14 $H_2S$ cycles had been completed. The data for this cyclic process are listed in Table I below:

(The abbreviation "meq." is used in the table below, and hereinafter in this specification as the standard abbreviation for milliequivalents.)

TABLE I.—CYCLIC REMOVAL OF $NH_3$ AND $H_2S$ FROM MIXTURE CONTAINING BOTH GASES USING SYSTEM ILLUSTRATED IN FIG. 1

Exhaustion Flow Rate=100 cc./min.
$NH_3$ Concentration=0.85%
Exhaustion Temperature=25–27° C.
$H_2S$ Concentration=0.85%
Column II=Resin J
Column III=Resin B

| Cycle | Volumes treated, l. | Adsorption Phase | | Desorption Phase | |
|---|---|---|---|---|---|
| | | $NH_3$ adsorbed, meq. | $H_2S$ adsorbed, meq. | $H_2S$ desorbed, meq. | $H_2S$ desorp. efficiency, percent |
| 1 | 5.0 | 1.74 | 3.46 | 1.96 | 57 |
| 2* | 3.5 | 1.24 | 2.42 | 1.38 | 57 |
| 3 | 5.7 | 1.98 | 3.94 | 2.84 | 74 |
| 4 | 5.5 | 1.91 | 3.80 | 3.52 | 93 |
| 5 | 5.5 | 1.91 | 3.80 | 2.56 | 67 |
| 6 | 5.3 | 1.84 | 3.66 | 2.32 | 64 |
| 7 | 5.3 | 1.84 | 3.66 | 2.42 | 66 |
| 8 | 5.4 | 1.85 | 3.73 | 2.54 | 68 |
| 9 | 5.5 | 1.89 | 3.80 | 2.91 | 77 |
| 10 | 5.5 | 1.89 | 3.80 | 1.84 | 48 |
| 11 | 5.5 | 1.93 | 3.89 | 2.30 | 61 |
| 12 | 5.3 | 1.84 | 3.66 | 2.32 | 63 |
| 13 | 5.5 | 1.91 | 3.80 | +3.08 | 81 |
| 14 | 5.7 | 1.94 | 3.94 | 3.06 | 78 |

*Unit shut down after passage of 3.5 l. of gas due to leak in system.

Figure 2B:
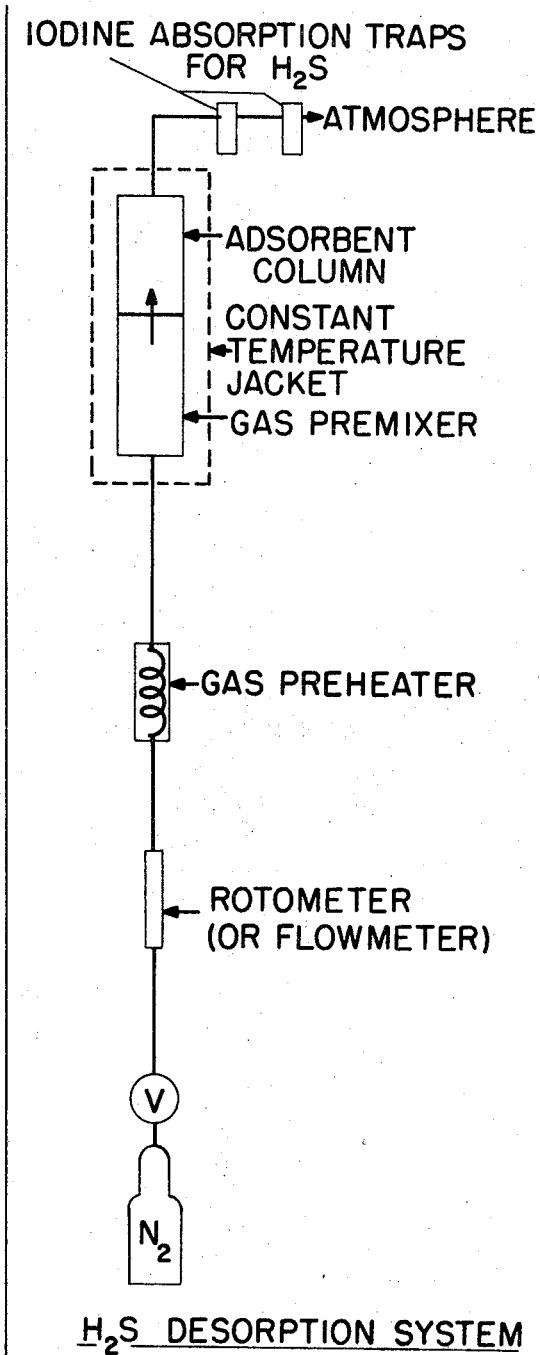

In FIG. 2 there is illustrated a typical apparatus for adsorbing and desorbing gases in accordance with this invention. For the sake of simplicity, the diagrams have been limited to an $H_2S$ application. In the adsorption system, hydrogen sulfide and dry nitrogen initially are metered into a gas mixing T type tube where dilution of the $H_2S$ to a desired concentration is effected. After mixing the two gases the stream which emerges is split into two channels. Gas from one of the two streams is throttled slowly to the atmosphere, providing an effective means of aiding in the control of the desired flow rate entering the adsorption column. Before entering that column, the gas stream is passed through a rotometer (flowmeter) and a pre-mixer column, which further assures homogeneity to the gas mitxure. In the laboratory version of this apparatus the adsorption column consisted of a ½" diameter straight glass tube containing the desired quantity of the adsorbent. From the adsorption column the gas is passed through traps containing iodine which absorb any $H_2S$ which remains in the effluent.

In the desorption system, dry nitrogen first is metered through the pre-mixer column and then through the column containing the adsorbent previously exhausted with hydrogen sulfide. The pre-mixer and the adsorbent column are maintained at constant temperatures by means of thermostatically controlled heating jackets, the temperature of the inside portion of the jackets in contact with the columns being conveniently measured by means of a pyrometer. A quantitative measurement of the desorbed $H_2S$ is obtained by bubbling a known volume of gas containing $H_2S$ into a standardized iodine solution, the $H_2S$ being oxidized thereby to free sulfur. The $H_2S$ content is determined by back titrating the iodine solution with 0.1 N sodium thiosulfate using starch as an indicator, the drop in iodine concentration representing the amount of H₂S present.

Using the just described apparatus, the general procedure for screening materials to be used as absorbents in the novel process was as follows. Hydrogen sulfide sorption runs were carried out by passing a dry nitrogen stream containing 2% (by volume) H₂S upflow through the adsorbent column containing approximately 80 ml. of the dry adsorbent being tested. The adsorbent in each case had been previously dried at 60° C. for 16 hours at reduced pressure (below 15 mm. of Hg.) or at 110° C. (atmospheric pressure). Hydrogen sulfide loadings were conducted at ambient temperature, usually employing a flow rate of 100 cc./min. until the influent and the effluent essentially were equal in hydrogen sulfide concentration. In the desorption phase, elution of hydrogen sulfide from the exhausted adsorbent was accomplished by passing dry preheated nitrogen upflow through the column at a flow rate of 10 cc./min. usually at 100° C. The hydrogen sulfide leakage during adsorption was determined quantitatively by gas-liquid-chromatography (or G.L.C. method) employing a Fisher Scientific Co. Gas Partitioner, Model 25V, or qualitatively by means of lead acetate paper. During elution, concentration of the desorbing H₂S was determined by the quantitative (G.L.C.) method. Total hydrogen sulfide leakage to the breakthrough point (exhaustion phase) and total purged hydrogen sulfide (elution phase) were determined iodiometrically after passing the column effluent gas streams through gas scrubbers containing standardized 0.1 N iodine solutions.

The ammonia sorption runs were performed essentially as in the case of H₂S. A dry nitrogen stream containing 1.95% NH₃ (by volume) was passed at 100 cc./min. flow rate until a 10% breakthrough point was reached or barely exceeded. Thermal desorption was performed using a 10 cc./min. gas flow passed through the column thermostated at 120–130° C.

Employing the previously described apparatus and methods for removing hydrogen sulfide, various anion exchange resins were considered with a view to comparing their H₂S adsorption capacities. From these resins the group recorded in Table II below has been selected as being illustrative of compositions which function satisfactorily in the present invention and also indicative of compositions which do not so function because they are off in at least one of the parameters which must be met in order for the resins to function effectively. As will be seen from the footnotes to the table, Resin A is the non-macroreticular material described previously. Resins B, C, D, E, F, G and H are all of the macroreticular category. Resin I is a macroreticular styrene-divinylbenzene copolymer which in itself possesses no ion exchange capacity, but which is typical of the polymeric precursors of Resins B to H, inclusive, all of which have anion exchange capacity except Resin G which is a macroreticular styrene-divinylbenzene copolymer equal in surface to Resin F, but possessing no ion exchange capacity.

It will further be noted from Table II that the gel type Resin A has substantially no surface area to speak of. Resin C, being a macroreticular-structured resin, by its very nature would be expected to have a certain amount of surface area, but in this case the resin was made so as purposely to limit its surface area to somewhat less than 1 m.²/g. Resin D is identical with Resin C, insofar as their basic copolymer compositions and macroreticular structure are concerned, but the former was made by a slightly different technique which resulted in a product having a surface area of 30 m.²/g. Resin E is also substantially identical with Resin B, except that by starting with a copolymer having different percentages of styrene-divinylbenzene a product was obtained whose surface area is 118 m.²/g. Likewise, Resins F and H are identical with Resins B except that by varying the percentages of the styrene and divinylbenzene in the copolymer the resultant products have different surface areas of the dimensions indicated in the table. Resin I, also identical with Resin B insofar as the type of their copolymer components are concerned, differs from Resin B in that Resin I has no ion exchange capacity and has been made so as to have a tremendously increased surface area (300 m.²/g. as compared with 46 m.²/g.).

TABLE II.—ADSORPTION OF H₂S BY VARIOUS RESINS*

| Resin: | Surface area, m.²/g. | Anion exchange capacity, meq./g. | H₂S capacity, meq. H₂S/l. of dry resin |
|---|---|---|---|
| A¹ | <0.1 | 4.2 | 0 |
| B² | 46 | 2.5 | 133 |
| C² | <1 | 4.2 | 0 |
| D² | 30 | 4.2 | 288 |
| E² | 118 | 1.2 | 94 |
| F² | 5 | 1.0 | 62 |
| G² | 5 | 0 | 0 |
| H² | 3.6 | 1.6 | 12 |
| I³ | 300 | 0 | 0 |

¹ Made in accordance with the disclosure in U.S. Patent 2,591,573.
² Made in accordance with the disclosure in U.S. Patent 3,247,242; Canadian Patent 708,227; and Dutch Patent 6,607,566.
³ Copolymer precursor of ion exchange resin made in accordance with the disclosure in U.S. Patent 3,247,242; Canadian Patent 708,227; and Dutch Patent 6,607,566. The copolymer is a non-ionogenic resin similar to that disclosed in U.S. Patent 2,974,178 but has a macroreticular structure similar to the polymeric absorbent disclosed in copending U.S. application Ser. No. 435,058 filed February 24, 1965 by R. L. Gustafson.
* All styrene-divinylbenzene based quaternary ammonium resins, operated anhydrous and in the chloride salt form, except for Resins G and I which had no ion exchange capacity. The resins varied from each other in terms of proportions of styrene and divinylbenzene, thereby making possible varying surface areas in the different resins.

For all practical purposes only resins having a minimum of H₂S-removal capacity of 60 meq. H₂S/l. of dry resin are considered commercially useful. Accordingly, as reference to Table II will show, Resins A, C, G, H and I are not useful for the practice of the present invention. A comparison of the various parameters of the resins in Table II indicates the probable reasons why these resins have insufficient H₂S-removal capacity as well as to indicate why the other resins do a satisfactory job of removing hydrogen sulfide. As is apparent from those data, the resins which perform satisfactorily must have a surface area of at least about 5 m.²/g. (see Resins B, D, E and F which meet this test and have a satisfactory capacity for removing H₂S). However, this minimum surface area is not the sole requirement, for Resin G which meets that minimum specification and Resin I which exceeds that minimum 60-fold both have no hydrogen sulfide removal capacity whatsoever. The reason for this appears to be the fact that both of these substances have no anion exchange capacity either.

Referring now to Resins B, D, E and F, each of which exhibits a satisfactory H₂S-removal capacity, it will be noted that, in addition to having at least a minimum surface area of 5 m.²/g., these resins also have at least a minimum anion exchange capacity of 1.0 meq./g. It is further apparent that this satisfactory H₂S removal ability is not attributable merely to the possession of at least 1 meq./g. ion exchange capacity, for Resin H has an ion exchange capacity of 1.6 meq./g. and has an H₂S capacity of only 12 meq. H₂S/l. The failure of Resin H to do a satisfactory job of removing H₂S must, therefore, be attributable to the fact that its surface area of 3.6 m.²/g. is insufficient.

From the above data, therefore, it must be concluded that for resins to be satisfactory in the practice of the present invention they must have a surface area of at least 5 m.²/g. and an anion exchange capacity of at least 1.0 meq./g. With these facts established, it is of further interest to evaluate the relative sharpness of the breakthrough which may be experienced during the exhaustion phase and the relative ease with which H₂S may be thermally diluted during the adsorption phase. For this purpose Resin B was employed in a series consisting of 19 cycles during which $H_2S$ was alternately adsorbed from a nitrogen stream containing 2% $H_2S$ and thermally desorbed at 100° C. aided by a slow flow of nitrogen purge gas. During each of the cycles, $H_2S$ leakage was essentially nil, as determined by the lead acetate paper test. These data are tabulated in Table III. The data were further employed to form the basis of the exhaustion and elution curves illustrated in FIGS. 4 and 5.

TABLE III.—CYCLIC REMOVAL OF $H_2S$ WITH RESIN B

Exhaustion Flow Rate=100 cc./min.
Exhaustion Temp.=25–29° C.
Elution Flow Rate=10 cc./min.
Elution Temp.=100° C.
Bed Volume=80 ml.
$H_2S$ Concentration=2%

| | Adsorption Phase | | | Desorption Phase | |
|---|---|---|---|---|---|
| Cycle | Temp., °C. | Volume treated, l. | $H_2S$ adsorbed, meq. | $H_2S$ desorbed, meq. | Desorption efficiency, percent |
| 1 | 29 | 7.5 | 10.62 | 6.72 | 63 |
| 2 | 26 | 7.2 | 11.55 | 7.38 | 64 |
| 3 | 27 | 6.7 | 10.28 | 6.76 | 66 |
| 4 | 27 | 6.2 | 9.45 | 6.64 | 70 |
| 5 | 28 | 5.3 | 7.70 | 3.06 | 40 |
| 6 | 25.5 | 5.0 | 7.52 | 4.06 | 54 |
| 7 | 27 | 5.0 | 7.74 | 4.64 | 60 |
| 8 | 24.5 | 5.5 | 8.75 | 5.56 | 64 |
| 9 | 25.5 | 5.2 | 7.92 | 5.62 | 71 |
| 10 | 27 | 5.0 | 7.62 | 5.26 | 69 |
| 11 | 23.5 | 5.5 | 8.35 | 5.90 | 71 |
| 12 | 24 | 5.7 | 8.65 | 6.14 | 71 |
| 13 | 24 | 5.4 | 8.25 | 6.38 | 77 |
| 14 | 26 | 5.2 | 7.62 | 5.86 | 77 |
| 15* | | | | | |
| 16** | 27 | 2.0 | 2.93 | 3.12 | 100 |
| 17 | 26 | 5.0 | 7.68 | 4.54 | 59 |
| 18 | 26 | 5.0 | 7.42 | 6.36 | 86 |
| 19 | 26 | 5.0 | 7.50 | 5.94 | 80 |

* Resin contacted with conc. $H_2S$ over weekend.
** Conc. $H_2S$ probably not eluted completely from resin after cycle 15.

As indicated previously, the $H_2S$ adsorption system must be substantially anhydrous. Due to the hydrophilic nature of anhydrous anion exchange resins, the effect of moisture on the $H_2S$ sorption process is to decrease the working capacity of the resin during a given cycle. In order to minimize this adverse effect, a scrubbing unit containing an appropriate desiccant may optionally be placed before the $H_2S$ adsorption column.

In the desorption phase it has been determined that increased elution temperatures accelerate the release of $H_2S$ at a given nitrogen purge phase rate. By performing the thermal elution in the region of 130° C., a temperature that approaches the accepted maximum at which resins of the type illustratively shown in Table III (quaternary ammonium resins in the salt form) are still stable, maximum concentration, and therefore maximum rate of release, of hydrogen sulfide results. In practice, it has been found possible to desorb $H_2S$ from an exhausted resin at the same temperature used during exhaustion. However, the volume of purge gas required is prohibitively large and is dependent on the desorption activation energy specific to a given resin. Illustrative of this general trend (without representing actual curves) are the elution profiles assumed at the various temperatures as depicted in FIG. 6.

Gaseous mixtures containing $CO_2$ in addition to $CH_4$ and $H_2S$ were submitted to the process of the present invention to determine whether $CO_2$ would have any detrimental effect on it. Using Resin D, evaluation of the inventive process was made on a stream which contained, on a volume basis, 65.5% $CH_4$, 33.5% $CO_2$ and 1.0% $H_2S$. A 2 cycle run was performed using a nitrogen stream containing 1.0% $H_2S$, and the same adsorption and desorption conditions described previously. This was followed by a 3 cycle run using the $CH_4$, $CO_2$ and $H_2S$ stream described above. The results are set forth in Table IV which follows:

TABLE IV.—REMOVAL OF $H_2S$ IN PRESENCE OF $CO_2$ USING RESIN D

Exhaustion Flow Rate=100 cc./min.
Exhaustion Temp.=23–25° C.
Elution Flow Rate=10 cc./min.
Elution Temp.=100–110° C.
Bed Volume=80 ml.

| | Stream Composition=99.0% $N_2$, 1% $H_2S$ | | | | |
|---|---|---|---|---|---|
| | Adsoprtion Phase | | | Desorption Phase | |
| Cycle | Temp., °C. | Volume treated, l. | $H_2S$ adsorbed, meq. | $H_2S$ desorbed, meq. | Desorption efficiency, percent |
| 1 | 25 | 12.2 | 9.90 | 7.18 | 73 |
| 2 | 25 | 12.0 | 9.56 | 6.80 | 71 |
| | Stream Composition=65.6% $CH_4$, 35.5% $CO_2$, 1% $H_2S$ | | | | |
| 1 | 23 | 11.4 | 9.25 | 7.24 | 78 |
| 2 | 23 | 10.8 | 8.19 | 13.04 | 159 |
| 3 | 23 | 11.0 | 8.61 | 12.76 | 148 |

From an examination of the desorption efficiencies observed during the last two cycles, $CO_2$ apparently has a beneficial rather than a detrimental effect with respect to the amount of $H_2S$ which may be eluted. It is apparent that the greater than theoretical desorption efficiencies found during the last two cycles can only be attributed to the release of $H_2S$ irreversibly adsorbed during previous cycles in which no $CO_2$ was present in the system. The property of the present invention which makes possible the removal of $H_2S$ from gas streams containing $CO_2$ is a significant improvement over prior art methods for removing $H_2S$ from gaseous streams, for all of them are drastically impaired whenever small amounts of $CO_2$ are present. Such prior art methods include the Seaboard process in which $H_2S$ and $CO_2$ are absorbed by dilute solutions of sodium carbonate; the phosphate process in which tri-potassium phosphate is used, and the $CO_2$ causes precipitation of potasisum bicarbonate to occur; the hot carbonate process in which the $CO_2$ causes formation of potassium bicarbonate; the amine process in which $CO_2$ deleteriously affects the capacity of ethanolamines to remove $H_2S$; and the molecular sieve method in which $CO_2$ is absorbed as well as $H_2S$.

In another series of tests the method of the present invention was employed to remove $H_2S$ from a methane stream. This has particular commercial interest since $H_2S$ occurs in natural sour gases (i.e. methane which contains some $H_2S$). In a two cycle study, the data from which are recorded in Table V below, it was determined that the $H_2S$-removal system of the present invention works just as well when the carrier gas is methane instead of nitrogen, thus indicating that the invention works satisfactorily regardless of the inert gas which is present.

TABLE V.—$H_2S$ REMOVAL IN PRESENCE OF METHANE GAS WITH RESIN B

Exhaustion Flow Rate=100 cc./min.
Exhaustion Temp.=24–25° C.
Elution Flow Rate=10 cc./min.
Elution Temp.=100° C.
Bed Volume=80 ml.
$H_2S$ Concentration=1.5%

| | Adsorption Phase | | | Desorption Phase | |
|---|---|---|---|---|---|
| Cycle | Temp. | Volume treated, l. | $H_2S$ absorbed, meq. | $H_2S$ desorbed, meq. | Desorption efficiency, percent |
| 1 | 24 | 8.5 | 9.65 | 6.70 | 70 |
| 2 | 25 | 7.7 | 8.89 | 6.48 | 73 |

Actually, $H_2S$ is just as readily removable by this invention when it is in the presence of other hydrocarbon gases besides methane, e.g. other members of the alkane series which are able to exist in the gaseous state under the operating conditions of our method.

All of the data described previously represent the practice of the present invention under atmospheric conditions. However, it is possible to obtain interesting effects when the invention is practiced under elevated pressures. As an illustration, in a pressurized unit a nitrogen stream containing 2% $H_2S$ was passed through a column containing 80 ml. of anhydrous Resin D under a 300 p.s.i. driving pressure, at a 100 cc./min. flow rate. The experiment was conducted at 25° C. and continued until the gas $H_2S$ effluent concentration equaled the influent concentration. A total of 123.4 meq. of $H_2S$ (1.54 meq. $H_2S$/ml. of dry resin) was found to have been adsorbed by the resin under the operating conditions. Upon reducing the pressure on the column, $H_2S$ was readily desorbed and the $H_2S$ still remaining adsorbed on the resin was found to amount to 24.25 meq. (0.30 meq. $H_2S$/ml. of dry resin). The amount of $H_2S$ desorbed in this manner corresponds to a value slightly in excess of 80% of the $H_2S$ adsorbed by the resin initially. On repeated cycling under these conditions, approximately 95% of the $H_2S$ adsorbed under pressure could be desorbed by reducing the pressure to atmospheric conditions.

A similar experiment was performed using an anhydrous sample of Resin A, a conventional gel structured resin. In this case, less than 2 meq. of $H_2S$ were adsorbed by the total resin bed under identical experimental conditions. The amount of $H_2S$ desorbed by reducing the pressure to atmospheric conditions was measured in this instance to be between 65 and 70% of the amount initially adsorbed by the resin at the higher pressure (300 p.s.i.).

The foregoing data concerning the effect of pressure on the $H_2S$ adsorption system clearly indicate that increased pressure does have a desirable effect when the Resin B type of adsorption is used in the practice of the inventive process, whereas there is no useful effect to speak of when the adsorbent is of the character which, in the discussion of the various adsorbents listed in Table II, is indicated as not being acceptable for the practice of the present invention. In essence, what these data illustrate is that, just as the capacity for $H_2S$ adsorption increases when the concentration of the gas is increased and the atmospheric pressure remains constant, the same increase in capacity can be achieved by increasing pressure rather than increasing the gas concentration. The pressure increase could optionally be anywhere in excess of 1 atmosphere (e.g. in excess of 200 atmospheres or more), depending on the equipment which is available for the purpose.

The procedure used for removing $NH_3$ was briefly explained above. However, since the data given in Table I concerned the removal of $NH_3$ from a mixture which also contained $H_2S$, there follows a description of a procedure used for the sorption of $NH_3$ in the absence of $H_2S$, as well as the data from a five cycle run. In this test a column similar to the one described for the $H_2S$ removal runs was packed with approximately 80 ml. of Resin J (a carboxylic resin formed from a mixture of a polyvinyl aryl compound and a monovinyl aliphatic compound), and a nitrogen stream containing 1.95% $NH_3$ was metered through the column at a flow rate of 100 cc./min. The exhaustion cycle was continued until a 10% breakthrough point was reached, the $NH_3$ leakage being conveniently checked by passage of the exiting gas from the column through a gas scrubber cylinder containing 100 ml. of 0.1 N $H_2SO_4$. The amount of $NH_3$ leakage per a given volume of gas was determined by back titration of the unreacted 0.1 N $H_2SO_4$ with standard caustic using methyl red indicator.

Thermal desorption of the $NH_3$ from the resin was accomplished by gradually increasing the temperature on the column while passing a nitrogen purge gas through the column at a flow of 10 cc./min. It was found that the greatest desorption of $NH_3$ occurred when the temperature at the column was maintained at 120–130° C. During the initial cycles, the $NH_3$ was adsorbed irreversibly with no elution of $NH_3$ being observed during the desorption phase. However, once the resin became fully saturated with $NH_3$ the process became reversible, with ammonia being eluted at times at concentrations of between 40–50 percent.

TABLE VI.—ADSORPTION OF $NH_3$ BY RESIN J

Exhaustion Flow Rate=100 cc./min.
Exhaustion Temp.=25–27° C.
Elution Flow Rate=10 cc./min.
Elution Temp.=120–130° C.
Bed Volume=80 ml.
$NH_3$ Conc.=1.95% in Nitrogen

| | Adsorption Phase | | Desorption Phase | |
|---|---|---|---|---|
| | Volume treated, l. | $NH_3$ adsorbed, meq. | $NH_3$ desorbed, meq. | Desorption efficiency, percent |
| Resin: | | | | |
| 1 | [1] 70 | 56.4 | 0 | |
| 2 | 40 | 32.06 | 0.20 | <1 |
| 3 | [2] 144 | | 34.40 | |
| 4 | 37 | 27.00 | >26.40 | >98 |
| 5 | 42 | 31.44 | 23.00 | [3] 73 |

[1] Column was not completely exhausted.
[2] 1.95% $NH_3$ passed overnight through column; percent leakage undetermined.
[3] Desorption was not carried out to completion.

The foregoing description, examples and illustrations indicate that this invention has broad application to the removal and separation of $H_2S$ and $NH_3$ in the presence or absence of each other, or in the presence of other gases. Certain parameters must be relied upon in the selection of resins which will perform satisfactorily in this invention, but even so there is some latitude possible in that choice. Actually, since the specific examples hereinabove given were merely set forth for purposes of illustration and not by way of limitation, it should be understood that the only limits to the breadth and scope of our invention are the following claims.

We claim:
1. A substantially anhydrous process for removing hydrogen sulfide from gaseous streams containing a mixture of $H_2S$ and at least one other gas, which consists in contacting the mixture with the chloride form of an anhydrous, insoluble, cross-linked, synthetic polymeric anion exchange resin having a macroreticular structure caused by the polymer having been prepared in the presence of a diluent with subsequent removal of the diluent from the polymer thus formed, said resin having a minimum surface area of about 5 square meters per gram of resin and a minimum of about 1 milli-equivalent per gram of anion exchange capacity.

2. A substantially anhydrous process for removing ammonia from gaseous streams containing a mixture of $NH_3$ and at least one other gas, which consists in contacting the mixture with the hydrogen form of an anhydrous, insoluble, cross-linked, synthetic polymeric carboxylic type cation exchange resin, said resin being formed from a mixture of a polyvinyl aryl compound and a monovinyl aliphatic compound.

3. A substantially anhydrous process for removing hydrogen sulfide from gaseous streams containing a mixture of $H_2S$ and at least one other gas, which process relies upon the use of a thermally regeneratable polymeric sorbent system, characterized in that one (1) removes $H_2S$ therefrom in an adsorption phase by contacting the mixture with the chloride form of an anhydrous, insoluble, cross-linked, synthetic polymeric anion exchange resin having a macroreticular structure caused by the polymer having been prepared in the presence of a diluent with subsequent removal of the diluent from the polymer thus formed, said resin having a minimum surface area of about 5 square meters per gram of resin and a minimum of about 1 milliequivalent per gram of anion exchange capacity, and (2) removes $H_2S$ from the resin in a desorption phase by contacting the resin with an inert gas heated to at least about 100° C.

4. A substantially anhydrous process for removing ammonia from gaseous streams containing a mixture of $NH_3$ and at least one other gas, which process relies upon the use of a thermally regeneratable polymeric sorbent system, characterized in that one (1) removes $NH_3$ in the adsorption phase by contacting the mixture with the hydrogen form of an anhydrous, insoluble, cross-linked, synthetic polymeric carboxylic type cation exchange resin until said resin is substantially saturated with $NH_3$, said resin being formed from a mixture of a polyvinyl aryl compound and a monovinyl aliphatic compound, and (2) removes $NH_3$ from the $NH_3$-saturated resin in a desorption phase by contacting the resin with an inert gas heated to at least about 120° C.

5. A substantially anhydrous process for removing and separating from each other both hydrogen sulfide and ammonia from gaseous streams containing a mixture of at least those two gases, which consists in contacting the mixture first with the chloride form of an anhydrous, insoluble, cross-linked, synthetic polymeric anion exchange resin having a macroreticular structure caused by the polymer having been prepared in the presence of a diluent with subsequent removal of the diluent from the polymer thus formed, said anion exchange resin having a minimum surface area of about 5 square meters per gram of resin and a minimum of about 1 milli-equivalent per gram of anion exchange capacity, and then with the hydrogen form of a anhydrous, insoluble, cross-linked synthetic polymeric carboxylic type cation exchange resin, said cation exchange resin being formed from a mixture of a polyvinyl aryl compound and a monovinyl aliphatic compound.

6. The process of claim 5 in which the anion exchange resin is heated to at least about 100° C. to desorb the $H_2S$ which thereupon may be collected if desired, and thereby regenerate the resin for re-use in the process of absorbing more $H_2S$.

7. The process of claim 5 in which the cation exchange resin, after it has become substantially saturated with $NH_3$, is heated at least to about 120° C. to desorb the $NH_3$ which thereupon may be collected if desired, and thereby regenerate the resin for re-use in the process of absorbing more $NH_3$.

8. The process of claim 5 in which the order of treatment of the gaseous stream is reversed so that the mixture of gases in first contacted with the cation exchange resin and then is contacted with the anion exchange resin.

9. The process of claim 6 in which the order of treatment of the gaseous stream in the adsorption phase is reversed so that the mixture of gases is first contacted with the cation exchange resin and then is contacted with the anion exchange resin.

10. The process of claim 7 in which the order of treatment of the gaseous stream in the adsorption phase is reversed so that the mixture of gases is first contacted with the cation exchange resin and then is contacted with the anion exchange resin.

11. The process of claim 1 in which the resin is maintained in a vessel having an influent end and an effluent end, and the gaseous mixture containing $H_2S$ is passed through the vessel under super-atmospheric pressure.

12. The process of claim 3 in which the resin is maintained in a vessel having an influent end and an effluent end, and the gaseous mixture containing $H_2S$ is passed through the vessel under super-atmospheric pressure.

13. The process of claim 5 in which the resin is maintained in a vessel having an enfluent end and an effluent end, and the gaseous mixture containing $H_2S$ is passed through the vessel under super-atmospheric pressure.

14. The process of claim 1 in which $CO_2$ is part of the gaseous mixture containing $H_2S$.

15. The process of claim 3 in which $CO_2$ is part of the gaseous mixture containing $H_2S$.

16. The process of claim 4 in which $CO_2$ is part of the gaseous mixture containing $H_2S$.

17. The process of claim 5 in which $CO_2$ is part of the gaseous mixture containing $H_2S$.

18. The process of claim 1 in which $CH_4$ is part of the gaseous mixture containing $H_2S$.

19. The process of claim 3 in which $CH_4$ is part of the gaseous mixture containing $H_2S$.

20. The process of claim 5 in which $CH_4$ is part of the gaseous mixture containing $H_2S$.

References Cited

UNITED STATES PATENTS

| | | | |
|---|---|---|---|
| 2,341,907 | 2/1944 | Cheetham et al. | 23—50X |
| 2,592,523 | 4/1952 | Ayers et al. | 23—2X |
| 2,713,077 | 7/1955 | Rieve | 23—2X |
| 3,466,138 | 9/1969 | Spiegler et al. | 23—2 |

FOREIGN PATENTS

| | | | |
|---|---|---|---|
| 790,510 | 2/1958 | Great Britain | 23—196 |

EARL C. THOMAS, Primary Examiner

U.S. Cl. X.R.

23—181, 196; 55—70, 73, 74